United States Patent [19]

Stapp

[11] Patent Number: 4,504,399

[45] Date of Patent: Mar. 12, 1985

[54] SURFACTANT AND PROCESS FOR ENHANCED OIL RECOVERY

[75] Inventor: Paul R. Stapp, Bartlesville, Okla.

[73] Assignee: Phillips Petroleum Company, Bartlesville, Okla.

[21] Appl. No.: 532,434

[22] Filed: Sep. 15, 1983

[51] Int. Cl.³ .............................................. E21B 43/22
[52] U.S. Cl. .............................. 252/8.55 D; 166/273; 166/275; 252/356
[58] Field of Search .......................... 252/8.55 D, 356; 166/273, 275

[56] References Cited

U.S. PATENT DOCUMENTS

| | | |
|---|---|---|
| 3,111,984 | 11/1963 | Relsberg . |
| 3,298,436 | 1/1967 | McCardell . |
| 3,330,347 | 7/1967 | Brown et al. . |
| 3,368,621 | 2/1968 | Relsberg . |
| 4,266,610 | 5/1981 | Meister ...................... 252/8.55 D X |
| 4,317,893 | 3/1982 | Chen et al. ................ 252/8.55 D X |
| 4,411,801 | 10/1983 | Pomerleau et al. ............. 252/356 X |

*Primary Examiner*—Leland A. Sebastian

[57] ABSTRACT

A novel surfactant is formed by reacting maleic anhydride with a polynuclear aromatic compound having a molecular weight of at least 155. A novel surfactant system useful in enhanced oil recovery containing the above surfactant is also provided. In addition, an improved process for the enhanced recovery of oil is provided utilizing the novel surfactant system.

14 Claims, No Drawings

SURFACTANT AND PROCESS FOR ENHANCED OIL RECOVERY

This invention relates to a novel surfactant and surfactant system useful in enhanced oil recovery. It also relates to a process for enhanced oil recovery using the novel surfactant system.

Crude oil which has accumulated in subterranean formations is recovered or produced through one or more wells drilled into the formations. Initial production of the crude oil is accomplished by "primary recovery" techniques wherein only the natural forces present in the formation are utilized to produce the oil. However, upon depletion of these natural forces and the termination of primary recovery a large portion of crude oil remains trapped within the formation. Also, many formations lack sufficient natural forces to be produced by primary methods from the very beginning. Recognition of these facts has led to the development and use of many enhanced oil recovery techniques one of which is surfactantflooding.

Surfactantflooding involves the injection of an aqueous composition, commonly called a surfactant system, into a subterranean oil bearing formation via one or more injection wells. Typically, the surfactant system comprises salt water and a surfactant, the latter preferably in conjunction with a cosurfactant. Common surfactants proposed for use in oil recovery processes include petroleum sulfonates, alkylsulfates, alkylarylsulfates, alkylaryl sulfonates, alkylsulfonates, alkylpolyethoxyalkylene sulfonates, and quaternary ammonium salts of fatty amines.

Once the surfactant system is injected, the generation of a microemulsion takes place in-situ as the injected surfactant system contacts the oil in place. Following injection of the surfactant system, a mobility buffer is usually injected to improve the sweep efficiency of the surfactant system thereby aiding the latter to move toward one or more production wells.

Surfactantflooding has been an area of active interest in the art of enhanced oil recovery for many years. Considerable research has been conducted to find new and effective surfactants which are useful in surfactant systems employed in oil recovery processes. Therefore, the continued development of such surfactants is highly desirable.

This invention relates to a novel surfactant composition as well as a surfactant system containing the same. It also relates to a process for enhanced oil recovery employing the surfactant system.

It is therefore an object of this invention to provide economical, novel surfactants for use in enhanced oil recovery.

A further object of this invention is to provide novel surfactant systems which are useful in oil recovery processes.

Another object of this invention is to provide a process for enhanced oil recovery employing the above surfactant system.

These and other aspects, objects, and advantages of the present invention are apparent from the specification and the appended claims.

In accordance with the present invention, I have discovered that the neutralized reaction product resulting from the reaction of maleic anhydride and an oil containing at least five weight percent of a polynuclear aromatic compound having a molecular weight of at least 155 can be utilized as a surfactant for enhanced oil recovery.

Therefore, in one embodiment of the present invention, there are provided novel surfactants useful for enhanced oil recovery.

In another embodiment of this invention there are provided novel surfactant systems containing salt water and the above surfactants which are useful in enhanced oil recovery.

In still another embodiment, wherein a process for the enhanced recovery of oil from an oil bearing subterranean formation which comprises injecting a surfactant system into the formation via one or more injection wells, an improvement is provided which comprises utilizing the above surfactant system.

The oils used in the present invention containing the polynuclear aromatic compounds will contain at least five weight percent of the polynuclear aromatic compound and preferably at least 15 weight percent of such.

The type of oil which will contain the polynuclear aromatic compounds are known in the art and can vary widely within the context of the present invention. For example, extract oils, atmospheric gas oils, vacuum gas oils, various types of crude oils, coal liquids and shale oils can contain polynuclear aromatic compounds.

The polynuclear aromatic compounds can be any fused-ring aromatic hydrocarbon having a molecular weight of at least 155. Generally, they should be susceptible to either Diels-Alder reactions or "ene" type reactions with maleic anhydride.

The process of forming the novel surfactant involves reacting maleic anhydride and an oil containing polynuclear aromatic compounds under conditions of time and temperature sufficient to form an adduct between the two compounds. This adduct can be referred to as a dicarboxylic anhydride reaction derivative.

Generally, the reaction temperature will be in the range of about 50° C. to 250° C., preferably about 100°–200° C.

The reaction time will generally be from about 1 hour to 21 days, preferably about 1 to 7 days.

Preferably, the above reaction is carried out in the presence of any diluent which is chemically inert; i.e. does not react chemically with the maleic anhydride, polynuclear aromatic compound, or reaction product. Presently preferred diluents are unsubstituted, alkyl-substituted and halogenated aromatics. Examples of such diluents include benzene, toluene, the xylenes, chlorobenzene, o-dichlorobenzene and mixtures thereof.

After the adduct is formed, any remaining unreacted maleic anhydride can be removed by sublimation if desired and the product may be isolated by extraction with aqueous alcoholic potassium hydroxide.

The adduct reaction product is cooled and then neutralized to a pH of from about 7 to 13 with any basic neutralizing agent known in the art. Examples of such neutralizing agents include sodium hydroxide, ammonium hydroxide, potassium hydroxide, calcium hydroxide or aqueous solutions of amines. Sodium hydroxide and ammonium hydroxide are presently preferred. The neutralizing agents are normally employed in an amount relative to the adduct within the range of from about 1:1 to 3:1, preferably about 1.9:1 to 2.2:1.

The reaction described hereinabove may be illustrated, for example, as follows:

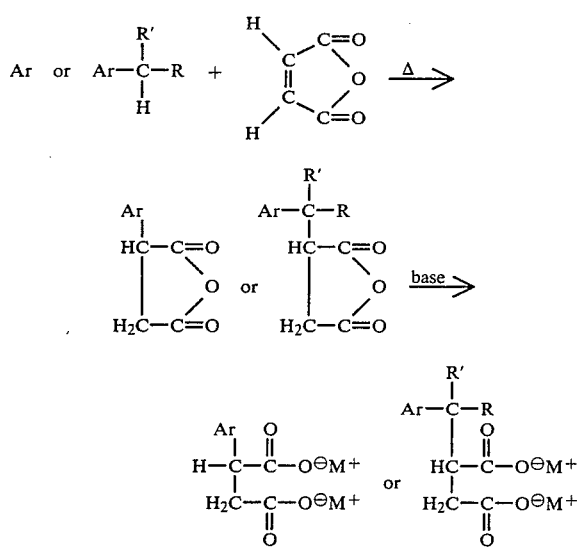

wherein M+ represents sodium, potassium and ammonium cations, R represents alkyl substitution, and R' represents either H or alkyl substitution.

The surfactant system of the present invention contains the above surfactant and salt water. Broad and preferred ranges of the ingredients in the surfactant system of this invention are shown in the following Table:

TABLE I

| Ingredient | Broad Range | Preferred Range |
|---|---|---|
| Water (parts by wt.) | 60 to 99.8 | 85 to 98 |
| Surfactant (parts by wt.) | 0.1 to 25 | 1 to 10 |
| NaCl (parts by wt.) | 0.1 to 15 | 0.2 to 5 |

In a preferred embodiment a cosurfactant will also be present. Examples of useful cosurfactants in this invention include alcohols, nitriles, nitro-compounds, amides, sulfones, sulfoxides, esters, aldehydes, and ketones containing from 1 to 20 carbon atoms and preferably 1 to 8 carbon atoms.

The presently preferred cosurfactant in the present invention is a $C_1$ to $C_8$ alcohol. Examples of such alcohols include methyl alcohol, ethyl alcohol, isopropyl alcohol, isobutyl alcohol, t-butyl alcohol, isoamyl alcohol, octyl alcohols, hexyl alcohols, and mixtures thereof. Most presently preferred are isobutyl alcohol and isoamyl alcohol. Generally, the alcohol should have a solubility of at least 0.1 to 20 and preferably at least 0.1–5 grams per 100 grams of brine.

Whatever cosurfactant is employed in the surfactant system will generally be present in an amount of from 0.05–15 and preferably 1–7 parts by weight based upon 100 parts by weight of water.

The surfactant systems of this invention may be used as surfactant systems in enhanced oil recovery processes to recover oil from oil-bearing subterranean formations. Such processes typically comprise injecting a surfactant system, sometimes referred to as a surfactant slug, into the oil bearing formations via one or more injection wells. The surfactant system is injected in an amount usually in the range of about 0.001 to 1.0, preferablly 0.01 to 0.25 pore volume based on the pore volume of the total treated and produced formation. A microemulsion takes place in-situ as the injected surfactant system contacts the oil in place.

Following injection of the surfactant system, a mobility buffer such as a polyacrylamide, biopolysaccharide, or cellulose ether may be injected into the formation. The injected mobility buffer will then aid in improving the sweep efficiency of the surfactant system thereby increasing the total amount of oil recovered from the subterranean formation.

The following examples illustrate the present invention.

EXAMPLE I

This example describes the preparation of an adduct from the reaction of maleic anhydride and a refinery extract oil.

The extract oil had an API gravity of 13, specific gravity of 0.98, a 5% distillation point of 900° F. and 80% distillation point of 1100° F., an average molecular weight of 530–550, and a BMCI (Bureau of Mines Chemical Index) of 66. The latter is related to the aromaticity of the extract oil.

A charge of 480 g extract oil, 108 g maleic anhydride and 900 mL chlorobenzene was placed in a 2-liter round-bottomed flask equipped with a magnetic stirrer and fitted to a ¾"×12" unpacked distillation column. The reaction mixture was boiled at reflux for a period of seven days. At the end of this reaction period, approximately 500 mL of the chlorobenzene was distilled off before removing the remaining chlorobenzene on a rotary evaporator. Unreacted maleic anhydride was removed in vacuo (0.2 mm/100° C.) over a period of 14.5 hours. The residue weighed 545.1 g.

A 369.7 g portion of the above residue was dissolved in 1500 mL of a 1:1 mixture of cyclohexane and toluene. This mixture was extracted three times with 650 mL aliquots of a 5% KOH solution in a 70:30 ethanol-water mixture. The combined aqueous alcoholic extracts were back-extracted one time with the cyclohexane-toluene mixture and all the organic layers were combined. The combined organic layers were stripped on a rotary evaporator to give 306.3 g of oil. This oil contained virtually no acidic components (neutralization equivalent 0.001 meq/g). The combined aqueous alcoholic extracts were stripped of volatiles on a rotary evaporator and the residual solution was acidified to a pH of about 2 with a 1:1 mixture of water and concentrated hydrochloric acid. The resulting black solid was collected on a Buchner funnel, washed with water and air-dried to give 64 g of product. This material had a neutralization equivalent of 2.50 meq/g and the neutralized material was used in a surfactant slug to recover waterflood residual oil from waterwet Berea sandstone core as described in Example V.

The following examples (II and III) demonstrate the reaction of maleic anhydride with two different topped crude oils (topped to 140° C.).

EXAMPLE II

A charge of 40 g North Burbank Unit (NBU) topped crude oil, 4.5 g maleic anhydride and 75 mL ortho-dichlorobenzene was placed in a 250 mL round-bottomed flask equipped with a magnetic stirrer and fitted to a ¾"×12" unpacked distillation column. The reaction mixture was boiled at reflux for 72 hours. At the end of this reaction period, the ortho-dichlorobenzene was removed on a rotary evaporator at water aspirator pressure and ca. 100° C. (hot water bath). Unreacted maleic anhydride was removed in vacuo (0.2 mm/100° C.) over a period of 6 hours. The residue weighed 31.3 g. This material had a neutralization equivalent of about 0.33 meq/g.

EXAMPLE III

A charge of 40 g Nacotosh topped crude oil, 4.5 g maleic anhydride and 75 mL ortho-dichlorobenzene was placed in a 250 mL round-bottomed flask equipped with a magnetic stirrer and fitted to a ¾"×12" unpacked distillation column. The reaction mixture was boiled at reflux for 72 hours. At the end of this reaction period, the ortho-dichlorobenzene was removed on a rotary evaporator at water aspirator pressure and ca. 100° C. (hot water bath). Unreacted maleic anhydride was removed in vacuo (0.2 mm/100° C.) over a period of 7.5 hours. The residue weighed 41.3 g. This material had a neutralization equivalent of 0.57 meq/g.

EXAMPLE IV

The following experimental procedure was used to condition sandstone cores for surfactantflood runs as conducted in Examples V–VII to demonstrate the effectiveness of the inventive material in tertiary oil recovery.

Berea sandstone cores measuring approximately 3 feet in length and 3 inches in diameter were dried under vacuum for 24 hours at 250° F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2:×12" were applied to the core in the following manner: a first gauze strip was applied to the core and covered with epoxy as the core was rotated; the remaining three strips were then individually incorporated in a similar manner. The core coating was cured over a period of about 4 hours at ambient temperatures as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected, and the pressure in psi were recorded. With these values the original permeability to water, e.g.; on the order of 3.2 mL/min at 43 psi could be recorded. The pore volume of the core was calculated by the relationship:

$$\frac{\text{Brine Saturated Core Wt. (g)} - \text{Dry Core Wt. (g)}}{\text{Brine Density (g/mL)}} = \text{Core Pore Volume (mL)}$$

The brine-saturated core was oilflooded in the conventional manner until oil break-through became detectable by the presence of alternate globules of oil and water in the effluent line. The oilflood was carried out to completion by the 24 hour recycling of oil through the core to remove all of the displaceable water. The total water displaced, i.e., water displaced at the point of oil break-through and water displaced by the 24 hour recycle procedure was recorded as water displaced by oilflood. If desired, oil permeability was determined in a manner analogous to that used above for establishing original permeability to water. Prior to waterflood, the effluent line was air blown to remove oil.

The oilflooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE V

This example demonstrates the oil recovery efficiency of a surfactant system containing the neutralized reaction adduct formed in Example I at a salinity of 1.5 wt % NaCl in Arkansas-Burbank (A-B) water which is essentially fresh water with less than 600 ppm total dissolved solids.

The surfactantflooding was carried out in the conventional manner of sequentially injecting the surfactant system and a thickened aqueous mobility buffer of polyacrylamide diluted with Arkansas-Burbank water continuously during the course of its injection.

The preflush system had the following composition:

| | |
|---|---|
| 0.8 g | Sodium bicarbonate |
| 0.4 g | Sodium carbonate |
| 12.0 g | Isoamyl alcohol |
| 6.0 g | Sodium chloride |
| 380.8 g | Arkansas-Burbank water |
| 400.0 g | Total Composition |

Thus, each component in the preflush system was present in the following weight percentages:

| | |
|---|---|
| NaHCO$_3$ | 0.2 |
| Na$_2$CO$_3$ | 0.1 |
| Isoamyl alcohol | 3.0 |
| NaCl | 1.5 |
| A-B Water | ca. 95 |

A 199.5 mL (25% PV) slug of the preflush system was injected prior to the surfactant system.

The surfactant system had the following composition:

| | |
|---|---|
| 8.52 g | Neutralized Adduct (Example I) |
| 0.84 g | NaOH |
| 9.0 g | Isoamyl Alcohol |
| 0.9 g | Sodium bicarbonate |
| 4.5 g | Sodium chloride |
| 276.24 g | Arkansas-Burbank water |
| 300.00 g | Total Composition |

Thus, each component was present in the surfactant system in the following weight percentages:

| | |
|---|---|
| Neutralized Adduct (Example I) | 3.0 |
| Isoamyl alcohol | 3.0 |
| NaHCO$_3$ | 0.3 |
| NaCl | 1.5 |
| A-B water | ca. 92 |

The pore volume of the 3"×3' cylindrical Berea sandstone core was 798 mL. A 199.5 mL (25% PV) slug of the above surfactant system was injected and it was followed by 399 mL (0.5% PV) of Betz Hi Vis polyacrylamide (ca. 1700 ppm) in Arkansas-Burbank water graded back logarithmically with Arkansas-Burbank water. Betz Hi Vis is a commercially available polyacrylamide from Betz Laboratories, Trevose, Pa., having an average molecular weight of from 8,000,000–12,000,000 and an average degree of hydrolysis of 27–34%.

In preparing the core, 535 mL of water (i.e., 1.5 wt % NaCl in Arkansas-Burbank water) was displaced from the water-saturated core by oilflood indicating the introduction of approximately 535 mL of oil into the core. Subsequent waterflood resulted in about 262.9 mL of oil being displaced from the core leaving about 272.1 mL of waterflood residual oil in the Berea sandstone core prior to the surfactantflood.

In the course of the surfactantflood, a total effluent of 1.83 pore volumes (ca. 1460 mL) was collected which contained 89 mL of tertiary oil representing 32.7% of the waterflood residual oil.

EXAMPLE VI

This example illustrates the oil recovery efficiency of a surfactant system containing the neutralized reaction adduct formed in Example I at a salinity of 3.0 wt % NaCl in Arkansas-Burbank water.

The preflush slug had the same composition as the preflush in the above example except the sodium chloride concentration was 3 wt %. A 17% PV (140 mL) slug of preflush was injected before the surfactant slug.

The surfactant system had the following composition:

| | |
|---|---|
| 8.52 g | Neutralized Adduct (Example I) |
| 0.84 g | NaOH |
| 9.0 g | Isoanyl alcohol |
| 0.9 g | NaHCO$_3$ |
| 9.0 g | NaCl |
| 271.74 g | Arkansas-Burbank water |
| 300.00 g | Total Composition |

Thus, each component was present in the surfactant system in the following weight percentages:

| | |
|---|---|
| Neutralized Adduct (Example I) | 3.0 |
| Isoamyl alcohol | 3.0 |
| NaHCO$_3$ | 0.3 |
| NaCl | 3.0 |
| A-B water | ca. 90.6 |

The pore volume of the 3"×3' cylindrical Berea sandstone core was 822 mL. A 140 mL (17% PV) slug of the above surfactant system was injected followed by 411 mL (0.5% PV) of Betz Hi Vis polyacrylamide (ca. 1700 ppm) in Arkansas-Burbank water graded back logarithmically with Arkansas-Burbank water.

In preparing the core, 595 mL of water (i.e., 3.0 wt % NaCl in Arkansas-Burbank water) was displaced from the water-saturated core by oilflood indicating the introduction of 595 mL of oil into the core. Subsequent waterflood resulted in about 301 mL of oil being displaced from the core leaving about 294 mL of waterflood residual oil in the Berea sandstone core prior to the surfactant flood.

In the course of the surfactant flood, a total effluent of 1.92 pore volumes (ca. 1584 mL) was collected which contained 33 mL of tertiary oil representing 11.2% of the waterflood residual oil.

EXAMPLE VII

This example illustrates the oil recovery efficiency of a surfactant system containing the neutralized reaction adduct formed in Example I at a salinity of 5 wt % NaCl in Arkansas-Burbank water.

The preflush system had the following composition:

| | |
|---|---|
| 0.8 g | Sodium bicarbonate |
| 0.4 g | Sodium carbonate |
| 12.0 g | Isoamyl alcohol |
| 20.0 g | Sodium chloride |
| 366.8 g | Arkansas-Burbank water |
| 400.0 g | Total Composition |

Thus, each component in the preflush system was present in the following weight percentages:

| | |
|---|---|
| NaHCO$_3$ | 0.2 |
| Na$_2$CO$_3$ | 0.1 |
| Isoamyl alcohol | 3.0 |
| NaCl | 5.0 |
| A-B water | ca. 92 |

A 142 mL (ca. 17% PV) slug of the preflush system was injected prior to the surfactant system.

The surfactant system had the following composition:

| | |
|---|---|
| 8.52 g | Neutralized Adduct (Example I) |
| 0.84 g | NaOH |
| 9.0 g | Isoamyl alcohol |
| 0.9 g | NaHCO$_3$ |
| 15.0 g | NaCl |
| 265.74 g | A-B water |
| 300.00 g | Total Composition |

Thus, each component was present in the surfactant system in the following weight percentages:

| | |
|---|---|
| Neutralized Adduct (Example I) | 3.0 |
| Isoamyl alcohol | 3.0 |
| NaHCO$_3$ | 0.3 |

-continued

| | |
|---|---|
| NaCl | 5.0 |
| A-B Water | 88.6 |

The pore volume of the 3"×3' cylindrical Berea sandstone core was 846 mL. A 142 mL (16.8% PV) slug of the above surfactant system was injected followed by 0.5 PV (423 mL) of Betz Hi Vis polyacrylamide (ca. 1700 ppm) in Arkansas-Burbank water graded back logarithmically with Arkansas-Burbank water.

In preparing the core, 593 mL of water (i.e., 5 wt % NaCl in Arkansas-Burbank water) was displaced from the water-saturated core by oilflood indicating the introduction of approximately 593 mL of oil into the core. Subsequent waterflood resulted in about 336.8 mL of oil being displaced from the core leaving about 256.2 mL of waterflood residual oil in the Berea sandstone core prior to the surfactantflood.

In the course of the surfactantflood, a total effluent of 1.86 pore volumes (ca. 1570 mL) was collected which contained 8.1 mL of tertiary oil representing ca. 3.2% of the waterflood residual oil.

Reasonable variations and modifications which will become apparent to those skilled in the art can be made in this invention without departing from the spirit and scope thereof.

I claim:

1. A surfactant composition made by the process comprising:
   (a) reacting maleic anhydride with an oil containing at least five weight percent of at least one polynuclear aromatic compound susceptible to either Diels-Alder reactions or to ene-type reactions, having a molecular weight of at least 155, at a temperature in the range of about 50°–250° C. for about 1 hour to 21 days to form a dicarboxylic anhydride reaction adduct; and
   (b) thereafter neutralizing said reaction adduct with a neutralizing agent to a pH in the range of 7–13.

2. A surfactant composition according to claim 1 wherein said oil contains at least fifteen weight percent of said polynuclear aromatic compound.

3. A surfactant composition according to claim 1 wherein said oil is one selected from the group consisting of aromatic extract oils, atmospheric gas oils, vacuum gas oils, topped crude oils, shale oils and coal liquids.

4. A surfactant composition according to claim 1 wherein the process in 1(a) is carried out in the presence of an inert diluent.

5. A surfactant system useful in enhanced oil recovery consisting essentially of:
   (a) 60–99.8 parts by weight water;
   (b) 0.1–15 parts by weight sodium chloride; and
   (c) 0.1–25 parts by weight of a surfactant composition made by the process comprising:
      (a) reacting maleic anhydride with an oil containing at least five weight percent of a polynuclear aromatic compound susceptible to either Diels-Alder reactions or to ene-type reactions, having a molecular weight of at least 155, at a temperature in the range of about 50°–250° C. for about 1 hour to 21 days to form a dicarboxylic anhydride reaction adduct; and
      (b) thereafter neutralizing said reaction adduct with a neutralizing agent to a pH in the range of 7–13.

6. A surfactant composition according to claim 5 wherein said water is present in an amount of from 85–98 parts by weight, said sodium chloride is present in an amount of from 0.2–5 parts by weight, and said surfactant composition is present in an amount of from 1–10 parts by weight.

7. A surfactant system according to claim 5 further containing a $C_1$ to $C_8$ alcohol surfactant.

8. A surfactant system according to claim 7 wherein said alcohol cosurfactant is isobutyl alcohol or isoamyl alcohol.

9. In a process for the recovery of oil from a subterranean formation which comprises injecting a surfactant system into the formation via one or more injection wells, the improvement which comprises utilizing a surfactant system consisting essentially of:
   (a) 60–99.8 parts by weight of water;
   (b) 0.1–15 parts by weight of sodium chloride;
   (c) 0.1–25 parts by weight of a surfactant composition made by the process comprising:
      (a) reacting maleic anhydride with an oil containing at least five weight percent of at least one polynuclear aromatic compound susceptible to either Diels-Alder reactions or to ene-type reactions, having a molecular weight of at least 155, at a temperature in the range of 50°–250° C. for about 1 hour to 21 days to form a dicarboxylic anhydride reaction adduct; and
      (b) thereafter neutralizing said reaction adduct with a neutralizing agent to a pH in the range of 7–13.

10. A process according to claim 9 wherein said surfactant system consists essentially of:
    (a) 85–98 parts by weight of water;
    (b) 0.2–5 parts by weight of sodium chloride; and
    (c) 1–10 parts by weight of a surfactant composition.

11. A process according to claim 9 wherein the surfactant system further contains a $C_1$ to $C_8$ alcohol cosurfactant.

12. A process according to claim 11 wherein said alcohol is isobutyl alcohol.

13. A process according to claim 11 wherein said alcohol is isoamyl alcohol.

14. A process according to claim 9 wherein said oil contains at least fifteen weight percent of said polynuclear aromatic compound.

* * * * *